(12) United States Patent
Swamy et al.

(10) Patent No.: US 12,737,362 B2
(45) Date of Patent: Sep. 15, 2026

(54) DATABASE CONFIGURATION SETTING OVERRIDES

(71) Applicant: Salesforce, Inc., San Francisco, CA (US)

(72) Inventors: Prateek Swamy, Fremont, CA (US); Yi Xia, Los Angeles, CA (US); Colm McHugh, Dublin (IE); Bradley Glasbergen, Squamish (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/423,882

(22) Filed: Jan. 26, 2024

(65) Prior Publication Data

US 2025/0245229 A1 Jul. 31, 2025

(51) Int. Cl.
*G06F 16/2455* (2019.01)
*G06F 16/2453* (2019.01)
*G06F 16/2457* (2019.01)

(52) U.S. Cl.
CPC .. *G06F 16/24552* (2019.01); *G06F 16/24542* (2019.01); *G06F 16/2457* (2019.01)

(58) Field of Classification Search
CPC ......... G06F 16/24552; G06F 16/24542; G06F 16/2457; G06F 16/9032; G06F 16/2453; G06F 16/2455; G06F 16/2425; G06F 16/334
USPC .......................................................... 707/718
See application file for complete search history.

(56) References Cited

U.S. PATENT DOCUMENTS 11,093,496 B1 * 8/2021 Bhatia ............... G06F 16/24552
11,645,281 B1 * 5/2023 Cruanes ............ G06F 16/24542 707/718
2006/0224563 A1 * 10/2006 Hanson ............. G06F 16/24542
2017/0132284 A1 * 5/2017 Baranczyk ........ G06F 16/24565
2018/0218030 A1 * 8/2018 Wong .................. G06F 16/2425
2018/0276276 A1 * 9/2018 Eidson .............. G06F 16/24542
2020/0192875 A1 * 6/2020 Rudolf ................ G06F 16/1734
2021/0240710 A1 * 8/2021 Korlapati ............ G06F 11/3409
2021/0271679 A1 * 9/2021 Lee ................... G06F 16/24552
2021/0357406 A1 * 11/2021 Potharaju ............ G06F 16/2471
2022/0147435 A1 * 5/2022 Dellatorre Borges ....................... G06F 16/90324
2022/0327127 A1 * 10/2022 Anand ................ G06F 16/2433
2023/0024210 A1 * 1/2023 Won ...................... G06F 16/217
2023/0135823 A1 5/2023 Zhang
2023/0205760 A1 6/2023 McHugh
(Continued)

*Primary Examiner* — Evan Aspinwall

(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to database configuration settings overrides. In some embodiments, a database system stores a set of default configuration settings that control operation of the database system. The database system receives a query requesting data from the database system, and metadata about the query. The database system determines, based on the query and the metadata, that a configuration settings override has been specified for the query, where the configuration settings override indicates that one or more of the default configuration settings are to be replaced with one or more configuration settings specific to the query. In response to the determining that a configuration settings override has been specified, the database system executes the query using the one or more specific configuration settings.

19 Claims, 7 Drawing Sheets

(56) References Cited

U.S. PATENT DOCUMENTS

2025/0086178 A1* 3/2025 Chong .................. G06F 16/242
2025/0130995 A1* 4/2025 Chong .............. G06F 16/24573

* cited by examiner

| Statement ID 202 | Query 102 |
|---|---|
| 4C634D77D1EAD | SELECT FROM t1 x, t2 y WHERE a1 = a2 |

Default Catalog Table 230

| Default Configuration Settings 106 |
|---|
| hash_agg = ON |
| timeout=400ms |

Override Catalog Table 240

| Statement ID 202 | Tenant ID 206 | User ID 208 | Expiration Criteria 418 | Override Configuration 108 |
|---|---|---|---|---|
| 4C634D77D1EAD | 00D00000000062 | 00000000005230 | V1.4 | hash_agg = OFF |
| 4C634D77D1EAD | 00D00000000062 | 00000000005230 | 0.0 | timeout=250ms |
| EBA24B6197EF013D | 00000000000000 | 00000000000000 | 0.0 | extended_pathkey_derivation = false |

DATABASE CONFIGURATION SETTING OVERRIDES

BACKGROUND

Technical Field

This disclosure relates generally to database systems, and, more specifically, to database system configurations.

Description of the Related Art

Enterprises routinely implement database systems that enable users to store a collection of information in an organized manner that can be efficiently accessed and manipulated. A database system can implement any of a variety of different types of databases to store information, such as a relational database, a non-relational database, etc. During operation, a database system receives requests from users via applications or from other systems, such as another database system, to perform transactions on information stored in a database store of the database system. To process requests, the database system relies on various sub-systems such as query parsers and optimizers to ensure the reliability, quality, etc. of the processing.

DETAILED DESCRIPTION

Figure 1:
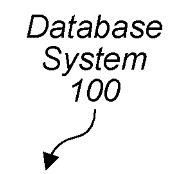
FIG. 1 is a block diagram illustrating one embodiment of a database system configured to support database configuration settings overrides.
Figure 1:
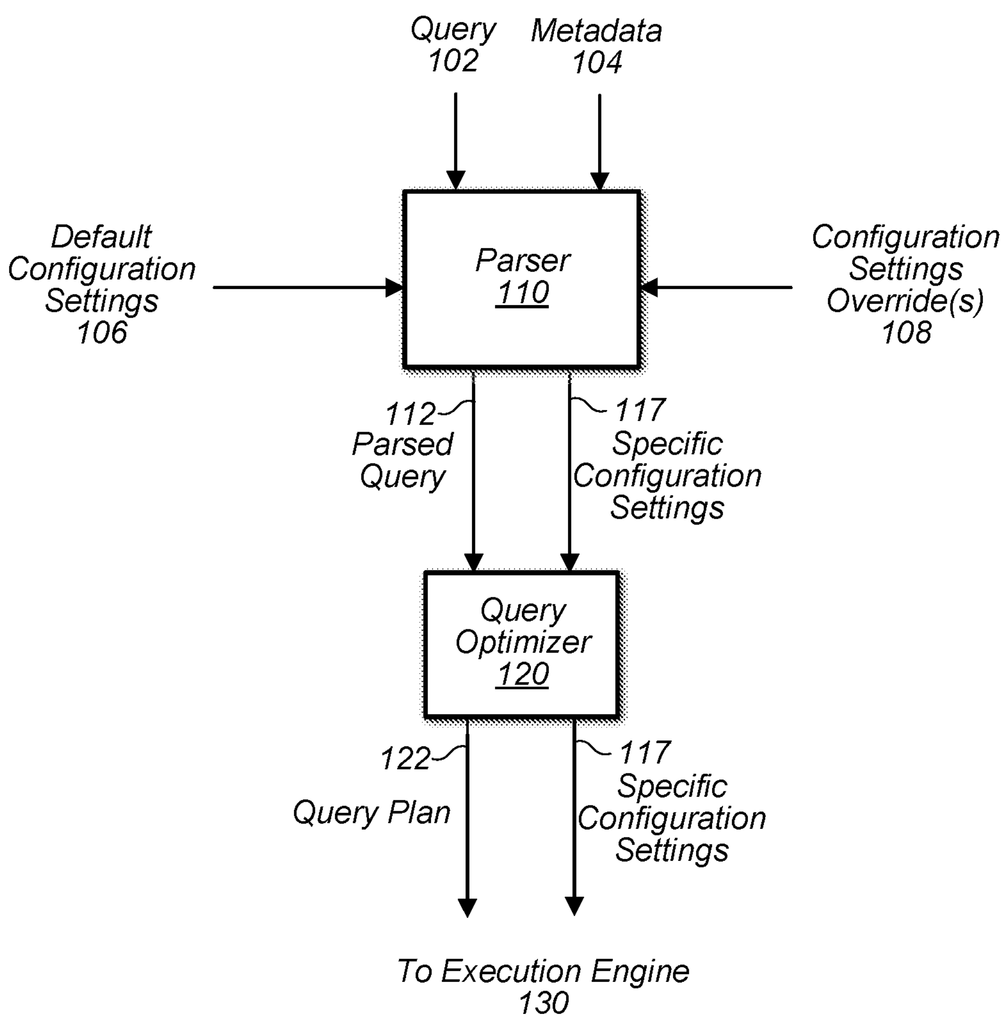

Database systems rely on configuration settings to control their behavior and query execution. An example of these configuration settings is POSTGRESQL's Grand Unified Configuration (GUC) system, which can allow a database administrator to set various configuration settings. For example, a database administrator may use a GUC to specify a timeout period for queries of the database system that limits how long queries are permitted to be executed before they will be aborted.

A downside of existing configuration settings, such as GUCs or other similar configuration setting systems, is that they apply to all queries (regardless of the particular tenants and users of the database system) that a database system executes. In this sense, these global settings may be regarded as being similar to global variables in other contexts as they are a one-size-fits-all approach and do not allow tailoring to particular tenants or queries, etc. of the database systems. For example, two enterprises that share a multi-tenant database system would also share default configuration settings, despite potentially having very different database sizes and performance requirements. Furthermore, a particular database setting may improve performance for the large majority of queries received by the database, but significantly reduce performance for a particular query or set of queries. Thus, there is a need for providing a configuration setting system that can be tailored to a particular tenant, user, or even query of the database system.

The present disclosure describes embodiments in which a database system uses override configuration settings that can apply to a particular entity, a particular one or more queries, a particular one or more groups of users, etc. As will be described below, the database system may store a set of default configuration settings that control the operation of the database system. But when the database system receives a query requesting data, it may determine, based on metadata received about the query, that a configuration settings override has been specified for the query. If the database system determines that a configuration settings override has been specified, it executes the query with the specific configuration settings identified in the override instead of using their corresponding default configuration settings. For example, the database may execute queries sent by a particular database tenant that needs a longer execution timeout due to the tenant having a particularly complex query that could sometimes fail when using the default timeout. An override could be set for the particular tenant that replaces the default timeout setting used for other tenants of the database system with a longer timeout setting. Thus, a database system may use configuration settings overrides to customize the configuration to fit a customer needs (e.g., by being able to specify specific tenants and/or users), developer needs (e.g., being able to disable an optimization or modify the timeout for only a particular query that behaves sub-optimally due to the optimization), etc.

Turning now to FIG. 1, a block diagram of a database system 100 configured to support queries 102 having configuration settings override 108 is depicted. In illustrated embodiment, database system 100 includes a parser 110, query optimizer 120, and execution engine 130. In some embodiments, database system 100 may be implemented differently than shown. For example, system 100 may include more components, etc.

Database system 100 may correspond to any suitable database system. In some embodiments, system 100 is a relational database management system (RDBMS), which may be implemented using, for example, Oracle™, MySQL™, Microsoft™ SQL Server, PostgreSQL™, IBM™ DB2, etc. Accordingly, system 100 may be configured to store data in one or more data tables, indexes, temporary, tables, etc. for servicing queries 102. In some embodiments, queries 102 are expressed using structured query language (SQL); but in other embodiments, other query declarative languages may be supported. In some embodiments, database system 100 may include a multi-tenant database in which multiple tenants may each store a respective set of data in the database. For example, the multi-tenant database may include a first set of data belonging to a non-profit organization (e.g., a first tenant) and a set of data belonging to a company (e.g., a second tenant). In such an embodiment, database system 100 may set, via configuration settings override 108, configuration settings for queries 102 associated with one particular tenant, but not other tenants.

Metadata 104, in various embodiments, is any data further describing query 102. As will be discussed in more detail with respect to FIG. 2, metadata 104 may include tenant, user, and/or query identifier. Yet further, metadata 104 may for example include identifiers of additional entities that were involved in the forwarding query 102, such as an identifier of a particular application server, a database server, etc. Thus, configuration settings may be specified using any identifier that can be included as metadata 104.

Parser 110, in various embodiments, is operable to parse a submitted query 102, which is accompanied by metadata 104. In some embodiments, this parsing may include performing a syntax analysis of the clauses within a query 102 and assembling a data structure (e.g., an expression tree sent as part of parsed query 112) that can be processed by query optimizer 120. Parser 110 may also use metadata 104 to select between default configuration settings 106 and configuration settings override 108 as specific configuration settings 117 for query 102, as will be described in more detail with respect to FIG. 2. Note that settings 117 may affect both query optimizer 120 and execution engine 130, as will be described in more detail with respect to FIG. 3.

Query optimizer 120, in various embodiments, is operable to generate a query plan 122 for a given query 102. Optimizer 120 may use any suitable algorithm to evaluate and select plans 122. In some embodiments, optimizer 120 may use a heuristic algorithm in which query plans 122 are assessed based on a set of rules provided to optimizer 120. In other embodiments, optimizer 120 uses a cost-based algorithm in which optimizer 120 performs a cost analysis that includes assigning scores to query plans 122 based on an estimated processor consumption, an estimated memory consumption, an estimated execution time, etc. Based on the cost analysis, optimizer 120 may then select a query plan 122 that has the best score. In still other embodiments, optimizer 120 may use a combination of heuristic and cost-based algorithms.

As discussed above, in various embodiments, optimizer 120 is further operable to evaluate configuration settings based on metadata 104 provided alongside query 102 and select plans 122 based on specific configuration settings 117. Various examples of configuration settings override 108 will be discussed in greater detail below with respect to FIGS. 3-5. These override configuration settings may, for example, include settings that apply to query optimizer 120 (e.g., query plan costs), execution engine 130 (e.g., timeout settings), etc.

Once specific configuration settings 117 have been specified, execution engine 130, in various embodiments, is operable to execute plan 122. Accordingly, engine 130 may perform the various actions listed in plan 122, which may include accessing one or more items of a database. Execution engine 130 may then return any results to service query 102. Similarly to query optimizer 120, engine 130 may itself also rely on specific configuration settings 117 when executing query 102. In one example use of engine 130 that will be described with respect to FIG. 3, configuration settings override 108 may cause execution engine 130 to perform query 102 with a longer timeout than that specified in default configuration settings 106.

Figure 2:
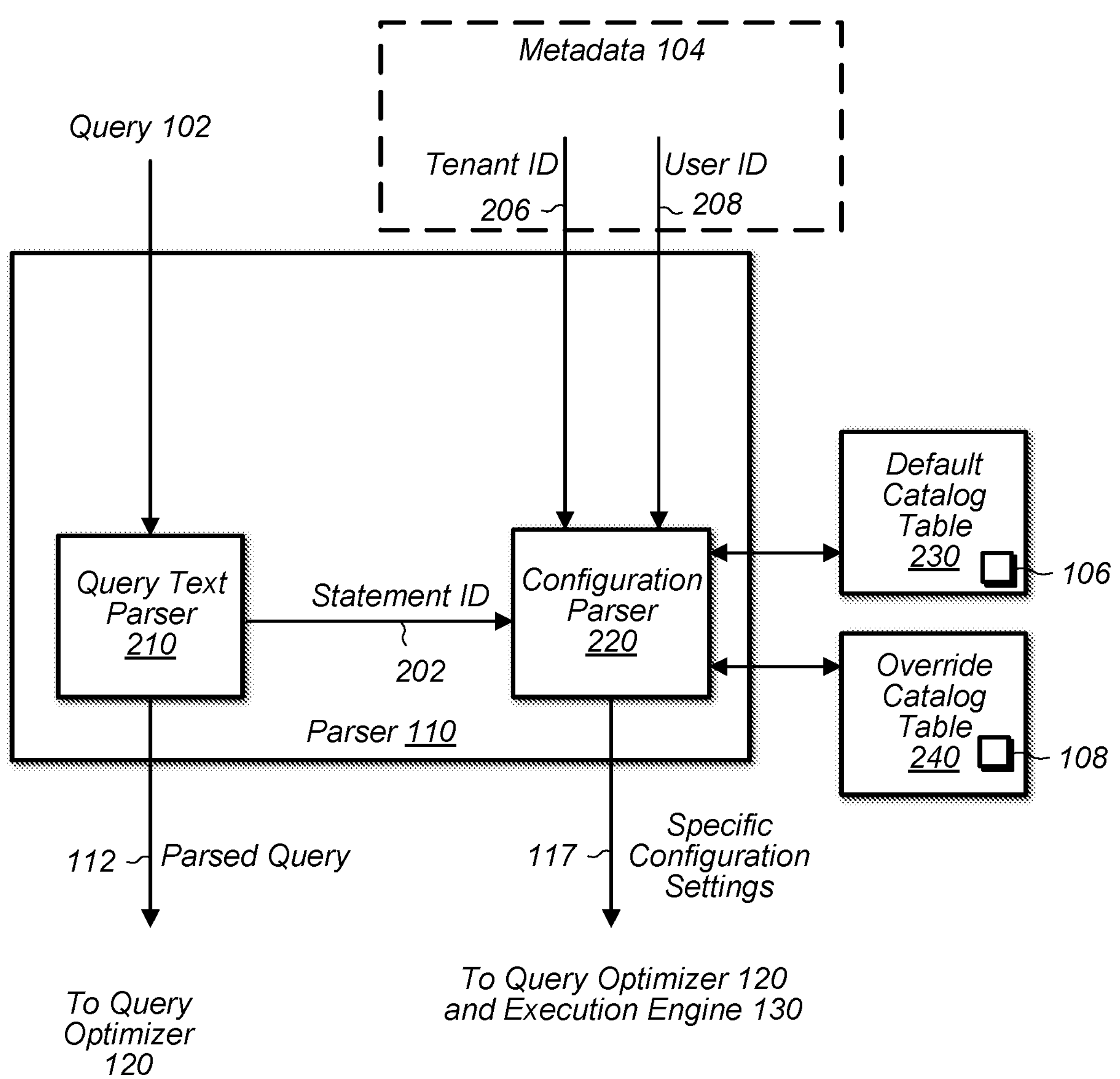
FIG. 2 is a block diagram illustrating one embodiment of a query parser of the database system.

Turning now to FIG. 2, a block diagram of a parser 110 is depicted. As noted above, in various embodiments, parser 110 handles parsing of a received query 102 for database system 100. In the illustrated embodiment, parser 110 uses query text parser 210 and a separate configuration parser 220 to select specific configuration settings 117 for query 102. In other embodiments, however, parser 110 may be implemented differently. Also as shown, configuration parser 220 queries catalog tables 230 and 240 to respectively retrieve configuration settings 106 and 108.

Query text parser 210, in various embodiments, parses the query text of a received query 102, and then issues parsed query 112 to query optimizer 120. As noted above, this may entail performing a syntax analysis of the clauses within a query 102 and assembling a parsed query 112 that can be processed by query optimizer 120. In some embodiments, parser 110 supports SQL; however, in other embodiments, other query declarative languages may be supported.

As shown, various types of metadata 104 are provided to configuration parser 220 for configuration setting retrieval. A tenant identifier 206, in various embodiments, is a unique identifier that is assigned to each tenant in order to distinguish one tenant from another. In some cases, tenants may include multiple users accessing system 100. User identifiers 208, in various embodiments, are unique identifiers that are assigned to each user in order to distinguish one user accessing system 100 from another. Additionally as shown, parser 210 provides statement ID 202 that can uniquely identify query 102 and thus used to determine specific configuration settings, according to some embodiments.

Configuration parser 220, in various embodiments, retrieves default configuration settings 106 and configuration settings overrides 108 from respective catalog tables 230 and 240 using various metadata associated with query 102). For example, configuration parser 220 may perform a lookup query on catalog tables 230 and 240 using one or more of items of metadata 104. Thus, configuration setting overrides 108 may be retrieved at any granularity offered by metadata 104, and overrides may thus be determined for one or more tenants via tenant ID 206, one or more users via user ID 208, one or more queries via statement ID 202, etc. In further embodiments, metadata 104 may be provided from some other source such as one or more elements in database system 100. In some embodiments, a user may use a user interface to cause override catalog table 240 to store additional configuration settings override 108 for query 102, as will be described in more detail with respect to FIG. 5.

Based on the received configuration settings 106 and/or configuration settings override(s) 108, configuration parser 220 determines whether a configuration override has been specified and accordingly issues specific configuration settings 117. If any such override exists (e.g., configuration parser 220 retrieves at least a configuration setting 108 from override catalog table 240), it will be reflected in specific configuration settings 117. Thus, parser 220 may, as part of issuing specific configuration settings 117, replace the default configuration settings 106 with corresponding override configuration setting 108, which are then provided by parser 110 to query optimizer 120 and execution engine 130. Said differently, specific configuration settings 117 will describe configurations for query 102, and these settings can include a mixture of default configuration settings 106 and configuration settings specified by configuration settings override 108. In various embodiments, if configuration parser 220 does not determine configuration settings override 108 (e.g., the query to override catalog table 240 returns no data, configuration settings overrides altogether were disabled as a feature, etc.), parser 110 selects default configuration settings 106 as specific configuration settings 117.

Figure 3:
FIG. 3 is a block diagram illustrating one embodiment of a database system applying database configuration settings overrides for a particular query.
Figure 3:
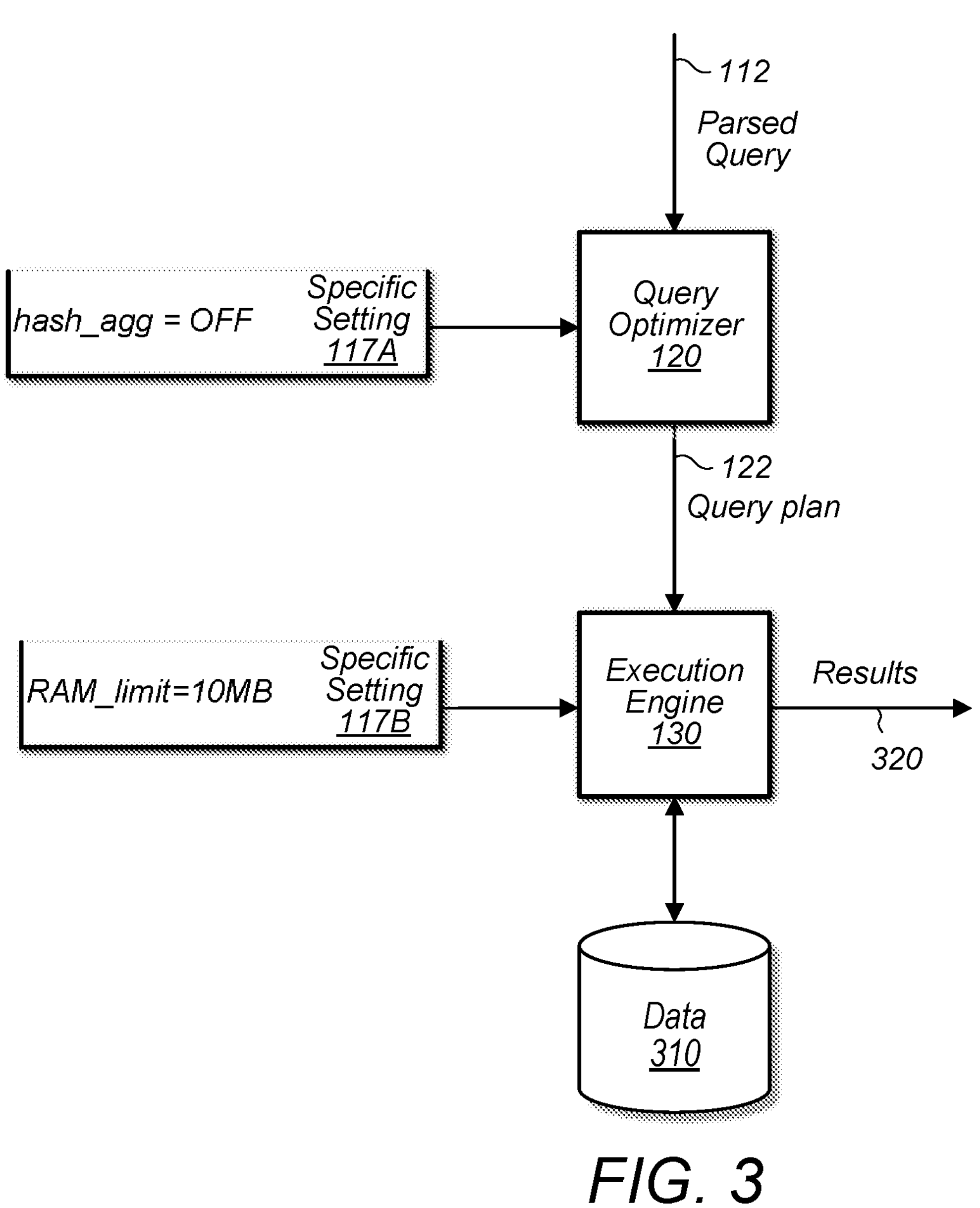

Turning now to FIG. 3, a block diagram of various components of database system 100 applying configuration settings overrides is depicted. As discussed in the section above and shown in FIG. 3, database system 100 may apply configuration overrides to both query optimizer 120 (e.g., via specific setting 117A) determining plan 122, and execution engine 130 (e.g., via specific setting 117B) performing query plan 122, communicating with data 310, and outputting a result 320 of query 102. This enables more granularity in configuring database system 100, as settings may affect features of parser 110, optimizer 120, execution engine 130, etc.

As discussed above, specific setting 117A can affect the behavior of query optimizer 120. In some embodiments, specific setting 117A may affect the behavior of optimizer 120 to avoid the selection, for query 102, of any plan that involves the use of hash aggregation. Another example specific setting 117A for query optimizer 120 affects the scoring of various plan components and thus the cost analysis used in determining query plan 122.

Additionally as shown, specific setting 117B instead operates on execution engine 130. As shown, specific setting 117B changes the RAM limit to a particular non-default value when executing query plan 122, which may be particularly valuable, for example, when the query is known to require more memory than typical queries do. As another example, the timeout for executing query 102/query plan 122 may be increased for tenants whose databases are known to be very large, or decreased for tenants that have very narrow latency requirements. As yet another example, a specific configuration setting 117B limits unauthorized accesses to data 310 based on permissions associated with a particular user and/or tenant identified in metadata 104 of query 102, according to some embodiments.

Thus, specific configuration settings 117 may target either or both query optimizer 120 and execution engine 130 (and any subcomponent(s) thereof) for particular users, tenants, queries, etc. This enables higher granularity for settings not only in terms of queries, but also in terms of the specific features being enabled, disabled, or otherwise modified. This is an improvement over existing techniques which only applied to query optimizer 120.

In some embodiments, determining specific configuration settings 117 for optimizer 120 may modify cached data plans related to default configuration settings 106. In one example, system 100 may, after determining an override, further determine that a cached default query plan based on default configuration settings 106 does not comply with the override, and subsequently determine a new query plan according to specific configuration settings 117 for use by execution engine 130. Optimizer 120 may, in some cases, further evict cached default plans from query optimizer 120 to evict plans whose features are not in accord with configuration settings override 108. In other cases, override configuration settings may not affect query optimizer 120 (e.g., those that apply to execution engine 130) and thus not result in evictions at internal caches of optimizer 120.

Another advantage of using the disclosed methods is that enabling specific configuration settings 117 at the level of query 102 obviates the need to restart one or more components of system 100 to apply specific configuration settings 117. In prior implementations without configuration settings overrides 108, a restart of one or more components of system 100 had to be performed, as any change in default settings would have to be applied for all queries. On the other hand, specific configuration settings 117 caused by overrides 108 are applied only for query 102, and performing a new query will entail determining new specific configuration settings 117 for that new query.

Figure 4:
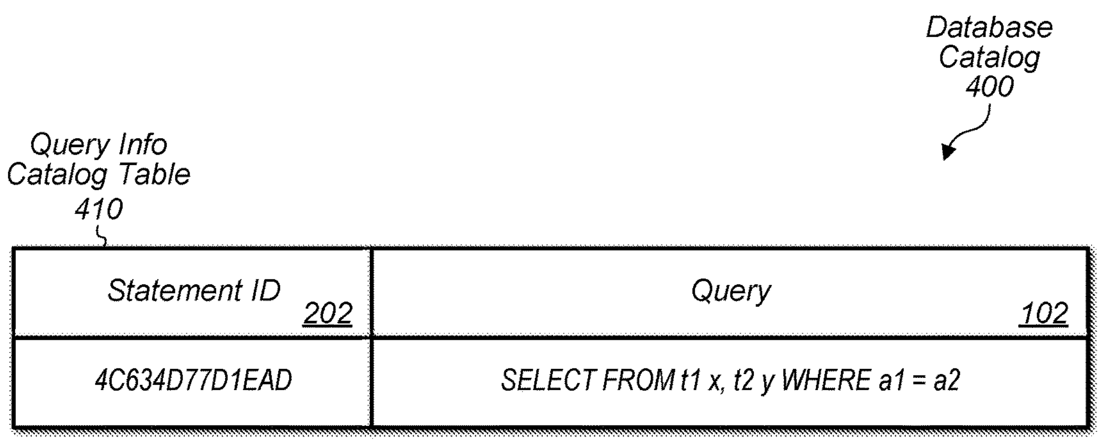
FIG. 4 is a block diagram illustrating one embodiment of catalog tables maintained by the database system to support database configuration settings overrides.

Turning now to FIG. 4, a block diagram illustrating embodiment of a database catalog 400 storing query plan overrides is depicted. In the illustrated embodiment, database catalog 400 includes query information catalog table 410, default catalog table 230, and override catalog table 240. Although not depicted, catalog 400 may also include multiple other tables for implementing database system 100. In other embodiments, catalog tables may be implemented differently—e.g., more (or fewer) catalog tables may be used to implement configuration settings overrides, more (or fewer) elements may be included in each table, override information may be stored externally to catalog 400, etc.

Query information catalog table 410, in various embodiments, includes various metadata about queries 102, which may have one or more corresponding configuration override settings. In the illustrated embodiment, each row in table 410 includes the text of a particular query 102 and a corresponding statement identifier 202, which is a unique value assigned to the particular query 102 to distinguish it from other queries. For example, as shown, the query 102 "SELECT /*!NL_JOIN(x y)*/*FROM t1 x, t2 y WHERE a1=a2" is assigned the statement identifier 202 "4C634D77D1EAD." In some embodiments, identifier 202 is used to look up, for query 102, both the default configuration settings 106 in catalog table 230 and configuration settings override 108 in catalog table 240. In other embodiments, query information catalog table 410 includes additional metadata such as various history information about when query 102 has been issued, how frequently it has been issued, performance metrics about query 102's implementation, etc. Note that in some embodiments, query text parser 210 (not shown) retrieves statement ID 202 from query information catalog table 410 to retrieve configuration settings overrides, default configuration settings, query plan overrides, etc.

Default catalog table 230, in various embodiments, includes default settings. In the illustrated embodiment, each row in table 230 includes the text of a default configuration setting 106. In further embodiments, catalog table 230 may include additional information, such as a version identifier to specify which database version default setting 106 is applicable. In other embodiments, default configuration settings 106 are stored, cached, and accessed as a filesystem file using an operating system executing at system 100.

Override catalog table 240, in various embodiments, includes various metadata about configuration settings override 108. In the illustrated embodiment, each row in table 240 includes the text of an individual setting to be overridden as well as the relevant statement identifier 202, tenant identifier 206, user identifier 208, and expiration criteria 418. As will be described below in more detail, the first two rows describe specific settings 107 that will supersede default configuration settings 106 for the particular tenant and user IDs. The third row, on the other hand, specifies an override for all executions of the query regardless of user or tenant ID.

In the illustrated embodiment, tenant identifiers 206 are specified in a given row of table 240 to indicate that a criterion of that row's override setting 108 is a query being issued for (or by) the particular tenant with tenant identifier 206. Accordingly, in the example depicted in FIG. 4, if a query having the statement identifier 202 "4C634D77D1EAD" is received for a tenant having the identifier 206 "00D00000000062," the first two rows (but not the third) will be used as override configuration settings. Thus, for this particular tenant-user combination, both default hash aggregation and timeout settings will be overridden.

Similar to tenant identifiers 206, user identifiers 208 are specified in a given row of table 240 to indicate that a criterion of that row's override setting 108 is a query 102 being issued for the particular user having that user identifier 208. The use of user identifiers 208 may allow for further granularity in specifying the configuration settings overrides compared to using tenant identifiers 206, according to some embodiments.

Also shown in the third row of table 240, override settings 106 may be implemented for all tenants and users for query 102 by setting both tenant ID 206 and user ID 208 as zero. This may be particularly helpful for queries that are problematic regardless of the user or tenant it is associated with. Consider for example a query with statement ID "EBA24B6197EF013D" which may have an issue with the use of a parent query during query optimization. Generally speaking, query optimizer 120 (not shown) uses extended path key derivation, during which a query's parent query is used to determine parameters for the query such as sort orders. But in some cases, the query may be structured in a way that causes errors as path key derivation is being performed. To avoid this error, the third row of catalog table 240 describes an override 108 that altogether disables the use of the parent query during path key derivation and is applied for all tenants and users submitting the query. As noted, this option is preferred over disabling extended pathkey derivation for all queries, which would have negative impact on performance for other queries with no performance issues caused by extended pathkey derivation.

Expiration criteria 418, in various embodiments, identifies one or more criteria for when an override 108 is to expire—i.e., is no longer to be applied. In the illustrated embodiment, expiration criteria 418 is expressed as a version identifier of the application that issues queries 102. In the example depicted in FIG. 4, the override 108 is valid for version 1.4 of the application issuing queries 102 but is not applied in later or earlier versions of the application. In the illustrated embodiment, a value of 0.0 indicates that no expiration criteria 418 has been specified for the corresponding override 108 (and is thus indefinitely applied for all versions of the application). In other embodiments, criteria 418 may be specified differently such as an expiration date, a version associated with database system 100, an epoch number, a time period for which the override is to be applied, etc. The use of expiration criteria 418 thus allows, for example, for the temporary fix of a particular problematic query until the next application version with a permanent fix becomes available. Another advantage of using expiration criteria 418 is that every execution of query 102 may thus be subject to a particular set of configuration overrides, even when otherwise identical metadata (e.g., same tenant, user and statement IDs).

Figure 5:
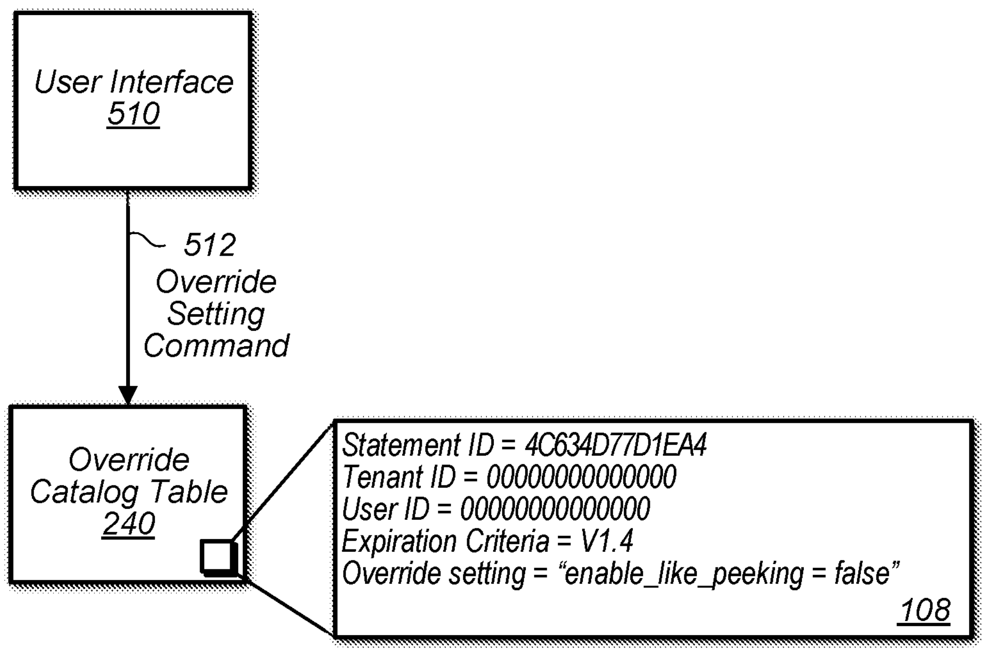
FIG. 5 is a block diagram illustrating one embodiment of a user interface adding database configuration settings overrides to a catalog table.

Turning now to FIG. 5, a block diagram of a user interface (UI) 510 adding configuration settings override 108 to catalog table 240 is depicted. As shown, UI 510 sends an override setting command 512 that includes various parameters of a new override configuration setting 108. Then, command 512 causes the storing of the new override configuration setting 108 in override catalog table 240. Then, other elements of database system 100 (e.g., query parser 110) may access the newly stored override configuration setting 108 when executing incoming queries.

UI 510, in some embodiments, is an interface that allows a particular user (e.g., a developer of system 100) to add configuration settings override 108 for queries, users, tenants, application versions, etc. UI 510 may be an application frontend, command line program, web page, etc. For example, consider a scenario in which a developer who is not involved in the development of system 100 itself experiences issues with a particular query 102. In that case, the developer can use UI 510 to specify a particular override setting that targets the query at the parameters set by command 512. Then, command 512 will cause the storing of the new setting in catalog table 240 for future access by system 100.

Consider the following example use-case scenario. A newly introduced feature allows query optimizer 120 to generate better plans for queries that contain LIKE predicates over a user-supplied parameter at execution time (e.g., "column1 LIKE $1"). But a developer notices during testing that in version 1.4 of system 100, optimizer 120 receiving a particular query with ID "4C634D77D1EA4" triggers a bug in system 100, which causes the new LIKE feature to not work properly and sub-optimal query plans to be selected. As the developer waits for system developers to fix the bug in system 100, he or she can use UI 510 to specify an override setting 108 as shown, which temporarily disables the problematic LIKE feature for the query that causes the bug until the new version of system 100 with the bug fix is released.

Thus, UI 510 (and system 100 more generally) is capable of accommodating developers of query 102 immediately. This advantageously provides a solution to specific issues at the query level that is more convenient than contacting developers of system 100 and waiting until they debug the particular query issue at the system level.

Figure 6:
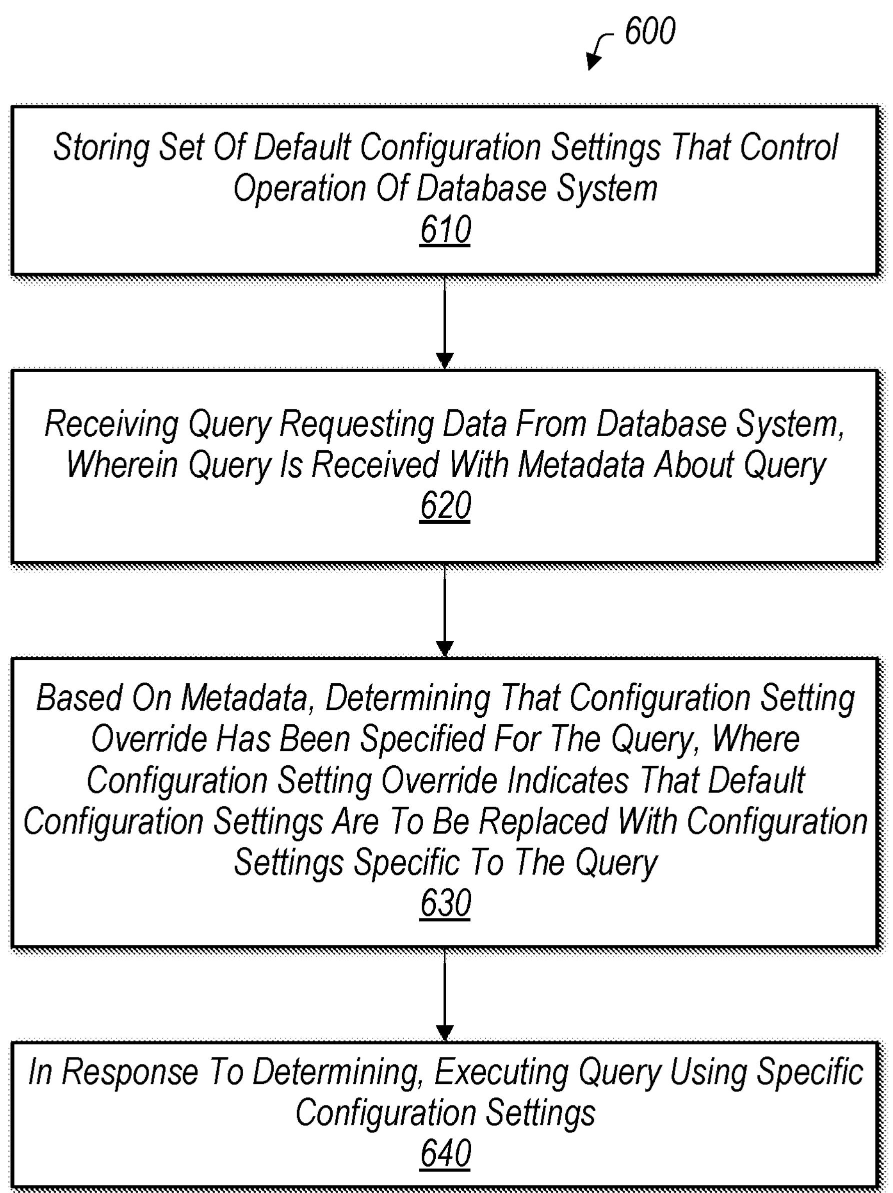
FIG. 6 is a flow diagram illustrating embodiments of a method associated with database configuration settings overrides.

Turning now to FIG. 6, a flow diagram of a method 600 is shown. Method 600 is one embodiment of a method that is performed by a database system (e.g., database system 100) that involves applying configuration settings overrides (e.g., configuration settings override 108) on database queries (e.g., query 102). In various embodiments, method 600 may be performed by executing program instructions stored on a non-transitory computer-readable storage medium. In some embodiments, method 600 includes more or fewer steps than shown. For example, method 600 may include a step in which the configuration settings override is received from a graphical user interface.

Method 600 begins in step 610 with a database system (e.g., system 100) storing a set of default configuration settings (e.g., default configuration settings 106) that control operation of the database system.

In step 620, the database system receives a query (e.g., query 102) requesting data from the database system, where the query is received with metadata (e.g., metadata 104) about the query. The metadata may include information identifying a user associated with the query and/or a tenant that includes a plurality of users accessing the database system.

In step 630, the database system determines, based on the metadata, that a configuration settings override (e.g., configuration settings override 108) has been specified for the query, where the configuration settings override indicates that one or more of the default configuration settings are to be replaced with one or more configuration settings specific to the query (e.g., specific configuration settings 117). The configuration settings override may specify, for the executing, a timeout indicating a permitted length of time and/or a memory limit of the database system. The database system may access the configuration settings override from a catalog table. The catalog table may be indexed based on a tenant identifier and/or a user identifier.

In step 640, the database system executes the query using the one or more specific configuration settings. The default configuration settings may cause the executing of the query with the default configuration settings to be limited to a first period of time, and the specific configuration settings may cause the executing of the query with the specific configuration settings to be limited to a second period of time.

In various cases, the configuration settings override may be related to query plans. The database system may cache, a set of query plans, including a default query plan that corresponds to the query and determine based on the configuration settings override that the default query plan does not comply with the specific configuration settings. The database system may then determine, based on the specific configuration settings, a specific query plan corresponding to the query. The database system may determine, based on the configuration settings override, whether to cache query plans in a cache of the database system as a result of the execution. The storing may be caused by the database system receiving the configuration settings override from a graphical user interface. The database system may determine, for the given query, 1) an initial query plan for the given query based on the default configuration settings, and 2) a different query plan for the given query based on the configuration settings override, where the different query plan is used in the executing. The database system may further determine that the initial query plan does not comply with the configuration settings override, and accordingly evict the initial query plan from a query plan cache.

In various cases, different configuration settings overrides may be applied to different tenants. The database system may receive two or more instances of the same query, where each instance is associated with a different tenant identifier, and accordingly determine, for each instance based on the respective tenant identifier, a different configuration settings override.

Exemplary Multi-Tenant Database System

Figure 7:
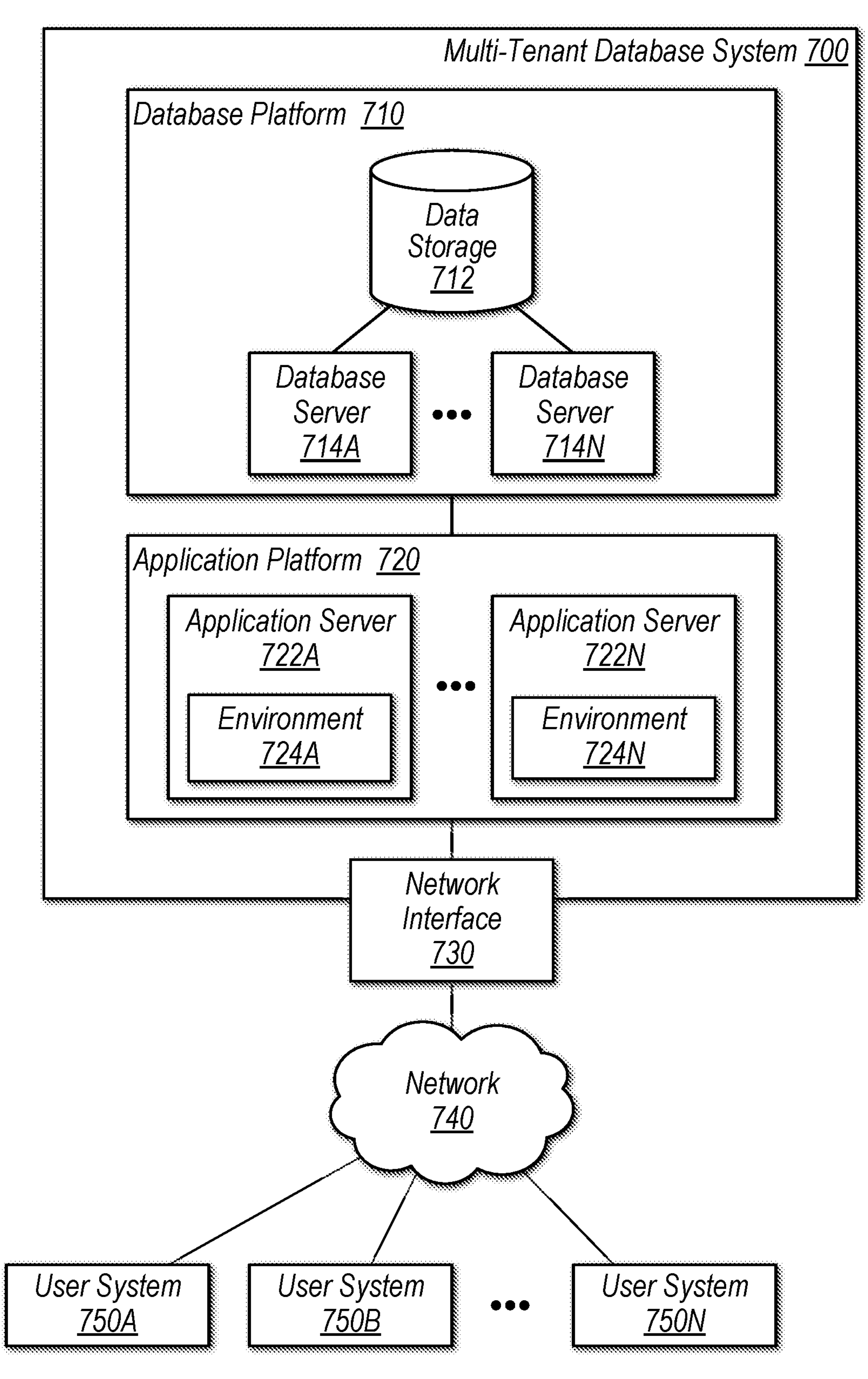
FIG. 7 is a block diagram illustrating one embodiment of an exemplary multi-tenant system for implementing various systems described herein.

Turning now to FIG. 7, an exemplary multi-tenant database system (MTS) 700, which may implement functionality of database system 100, is depicted. In the illustrated embodiment, MTS 700 includes a database platform 710, an application platform 720, and a network interface 730 connected to a network 740. Database platform 710 includes a data storage 712 and a set of database servers 714A-N that interact with data storage 712, and application platform 720 includes a set of application servers 722A-N having respective environments 724. In the illustrated embodiment, MTS 700 is connected to various user systems 750A-N through network 740. In other embodiments, techniques of this disclosure are implemented in non-multi-tenant environments such as client/server environments, cloud computing environments, clustered computers, etc.

MTS 700, in various embodiments, is a set of computer systems that together provide various services to users (alternatively referred to as "tenants") that interact with MTS 700. In some embodiments, MTS 700 implements a customer relationship management (CRM) system that provides mechanism for tenants (e.g., companies, government bodies, etc.) to manage their relationships and interactions with customers and potential customers. For example, MTS 700 might enable tenants to store customer contact information (e.g., a customer's website, email address, telephone number, and social media data), identify sales opportunities, record service issues, and manage marketing campaigns. Furthermore, MTS 700 may enable those tenants to identify how customers have been communicated with, what the customers have bought, when the customers last purchased items, and what the customers paid. To provide the services of a CRM system and/or other services, as shown, MTS 700 includes a database platform 710 and an application platform 720.

Database platform 710, in various embodiments, is a combination of hardware elements and software routines that implement database services for storing and managing data of MTS 700, including tenant data. As shown, database platform 710 includes data storage 712. Data storage 712, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data 310 implements at least a portion of data storage 712. Data storage 712 may implement a single database, a distributed database, a collection of distributed databases, a database with redundant online or offline backups or other redundancies, etc. As part of implementing the database, data storage 712 may store one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 700 may store, in the same table, database records for one or more tenants-that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, data storage 712 is organized as part of a log-structured merge-tree (LSM tree). As noted above, a database server 714 may initially write database records into a local in-memory buffer data structure before later flushing those records to the persistent storage (e.g., in data storage 712). As part of flushing database records, the database server 714 may write the database records into new files/extents that are included in a "top" level of the LSM tree. Over time, the database records may be rewritten by database servers 714 into new files included in lower levels as the database records are moved down the levels of the LSM tree. In various implementations, as database records age and are moved down the LSM tree, they are moved to slower and slower storage devices (e.g., from a solid-state drive to a hard disk drive) of data storage 712.

When a database server 714 wishes to access a database record for a particular key, the database server 714 may traverse the different levels of the LSM tree for files that potentially include a database record for that particular key. If the database server 714 determines that a file may include a relevant database record, the database server 714 may fetch the file from data storage 712 into a memory of the database server 714. The database server 714 may then check the fetched file for a database record having the particular key. In various embodiments, database records are immutable once written to data storage 712. Accordingly, if the database server 714 wishes to modify the value of a row of a table (which may be identified from the accessed database record), the database server 714 writes out a new database record into the buffer data structure, which is purged to the top level of the LSM tree. Over time, that database record is merged down the levels of the LSM tree. Accordingly, the LSM tree may store various database records for a database key such that the older database records for that key are located in lower levels of the LSM tree than newer database records.

Database servers 714, in various embodiments, are hardware elements, software routines, or a combination thereof capable of providing database services, such as data storage, data retrieval, and/or data manipulation. Accordingly, in some embodiments, database servers 714 execute parser 110, query optimizer 120 and/or execution engine 130 discussed above. Such database services may be provided by database servers 714 to components (e.g., application servers 722) within MTS 700 and to components external to MTS 700. As an example, a database server 714 may receive a database transaction request from an application server 722 that is requesting data to be written to or read from data storage 712. The database transaction request may specify an SQL SELECT command to select one or more rows from one or more database tables. The contents of a row may be defined in a database record and thus database server 714 may locate and return one or more database records that correspond to the selected one or more table rows. In various cases, the database transaction request may instruct database server 714 to write one or more database records for the LSM tree—database servers 714 maintain the LSM tree implemented on database platform 710. In some embodiments, database servers 714 implement a relational database management system (RDMS) or object-oriented database management system (OODBMS) that facilitates storage and retrieval of information against data storage 712. In various cases, database servers 714 may communicate with each other to facilitate the processing of transactions. For example, database server 714A may communicate with database server 714N to determine if database server 714N has written a database record into its in-memory buffer for a particular key.

Application platform 720, in various embodiments, is a combination of hardware elements and software routines that implement and execute CRM software applications as well as provide related data, code, forms, web pages and other information to and from user systems 750 and store related data, objects, web page content, and other tenant information via database platform 710. In order to facilitate these services, in various embodiments, application platform 720 communicates with database platform 710 to store, access, and manipulate data. Accordingly, in some embodiments, application platform 720 (or more specifically application servers 722) may correspond to clients discussed above. In some instances, application platform 720 may communicate with database platform 710 via different network connections. For example, one application server 722 may be coupled via a local area network and another application server 722 may be coupled via a direct network link. Transfer Control Protocol and Internet Protocol (TCP/IP) are exemplary protocols for communicating between application platform 720 and database platform 710, however, it will be apparent to those skilled in the art that other transport protocols may be used depending on the network interconnect used.

Application servers 722, in various embodiments, are hardware elements, software routines, or a combination thereof capable of providing services of application platform 720, including processing requests received from tenants of MTS 700. Application servers 722, in various embodiments, can spawn environments 724 that are usable for various purposes, such as providing functionality for developers to develop, execute, and manage applications. Data may be transferred into an environment 724 from another environment 724 and/or from database platform 710. In some cases, environments 724 cannot access data from other environments 724 unless such data is expressly shared. In some embodiments, multiple environments 724 can be associated with a single tenant.

Application platform 720 may provide user systems 750 access to multiple, different hosted (standard and/or custom) applications, including a CRM application and/or applications developed by tenants. In various embodiments, application platform 720 may manage creation of the applications, testing of the applications, storage of the applications into database objects at data storage 712, execution of the applications in an environment 724 (e.g., a virtual machine of a process space), or any combination thereof. In some embodiments, application platform 720 may add and remove application servers 722 from a server pool at any time for any reason, there may be no server affinity for a user and/or organization to a specific application server 722. In some embodiments, an interface system (not shown) implementing a load balancing function (e.g., an F5 Big-IP load balancer) is located between the application servers 722 and the user systems 750 and is configured to distribute requests to the application servers 722. In some embodiments, the load balancer uses a least connections algorithm to route user requests to the application servers 722. Other examples of load balancing algorithms, such as are round robin and observed response time, also can be used. For example, in certain embodiments, three consecutive requests from the same user could hit three different servers 722, and three requests from different users could hit the same server 722.

In some embodiments, MTS 700 provides security mechanisms, such as encryption, to keep each tenant's data separate unless the data is shared. If more than one server 714 or 722 is used, they may be located in close proximity to one another (e.g., in a server farm located in a single building or campus), or they may be distributed at locations remote from one another (e.g., one or more servers 714 located in city A and one or more servers 722 located in city B). Accordingly, MTS 700 may include one or more logically and/or physically connected servers distributed locally or across one or more geographic locations.

One or more users (e.g., via user systems 750) may interact with MTS 700 via network 740. User system 750 may correspond to, for example, a tenant of MTS 700, a provider (e.g., an administrator) of MTS 700, or a third party. Each user system 750 may be a desktop personal computer, workstation, laptop, PDA, cell phone, or any Wireless Access Protocol (WAP) enabled device or any other computing device capable of interfacing directly or indirectly to the Internet or other network connection. User system 750 may include dedicated hardware configured to interface with MTS 700 over network 740. User system 750 may execute a graphical user interface (GUI) corresponding to MTS 700, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 750 to access, process, and view information and pages available to it from MTS 700 over network 740. Each user system 750 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 700 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 750 may be users in differing capacities, the capacity of a particular user system 750 might be determined one or more permission levels associated with the current user. For example, when a salesperson is using a particular user system 750 to interact with MTS 700, that user system 750 may have capacities (e.g., user privileges) allotted to that salesperson. But when an administrator is using the same user system 750 to interact with MTS 700, the user system 750 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 700 that are allocated at the tenant level while other data structures are managed at the user level.

In some embodiments, a user system 750 and its components are configurable using applications, such as a browser, that include computer code executable on one or more processing elements. Similarly, in some embodiments, MTS 700 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 740 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 750 may communicate with MTS 700 using TCP/IP and, at a higher network level, use other common Internet protocols to communicate, such as HTTP, FTP, AFS, WAP, etc. For example, where HTTP is used, user system 750 might include an HTTP client commonly referred to as a "browser" for sending and receiving HTTP messages from an HTTP server at MTS 700. Such a server might be implemented as the sole network interface between MTS 700 and network 740, but other techniques might be used as well or instead. In some implementations, the interface between MTS 700 and network 740 includes load sharing functionality, such as round-robin HTTP request distributors to balance loads and distribute incoming HTTP requests evenly over a plurality of servers.

In various embodiments, user systems 750 communicate with application servers 722 to request and update system-level and tenant-level data from MTS 700 that may require one or more queries to data storage 712. In some embodiments, MTS 700 automatically generates one or more SQL statements (the SQL query) designed to access the desired information. In some cases, user systems 750 may generate requests having a specific format corresponding to at least a portion of MTS 700. As an example, user systems 750 may request to move data objects into a particular environment 724 using an object notation that describes an object relationship mapping (e.g., a JavaScript object notation mapping) of the specified plurality of objects.

The various techniques described herein and all disclosed or suggested variations, may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, systems that implement the methods described with respect to any of the disclosed techniques are also contemplated. One such environment in which the disclosed techniques may operate is a cloud computer system. A cloud computer system (or cloud computing system) refers to a computer system that provides on-demand availability of computer system resources without direct management by a user. These resources can include servers, storage, databases, networking, software, analytics, etc. Users typically pay only for those cloud services that are being used, which can, in many instances, lead to reduced operating costs. Various types of cloud service models are possible. The Software as a Service (SaaS) model provides users with a complete product that is run and managed by a cloud provider. The Platform as a Service (PaaS) model allows for deployment and management of applications, without users having to manage the underlying infrastructure. The Infrastructure as a Service (IaaS) model allows more flexibility by permitting users to control access to networking features, computers (virtual or dedicated hardware), and data storage space. Cloud computer systems can run applications in various computing zones that are isolated from one another. These zones can be within a single or multiple geographic regions.

A cloud computer system includes various hardware components along with software to manage those components and provide an interface to users. These hardware components include a processor subsystem, which can include multiple processor circuits, storage, and I/O circuitry, all connected via interconnect circuitry. Cloud computer systems thus can be thought of as server computer systems with associated storage that can perform various types of applications for users as well as provide supporting services (security, load balancing, user interface, etc.).

One common component of a cloud computing system is a data center. As is understood in the art, a data center is a physical computer facility that organizations use to house their critical applications and data. A data center's design is based on a network of computing and storage resources that enable the delivery of shared applications and data.

The term "data center" is intended to cover a wide range of implementations, including traditional on-premises physical servers to virtual networks that support applications and workloads across pools of physical infrastructure and into a multi-cloud environment. In current environments, data exists and is connected across multiple data centers, the edge, and public and private clouds. A data center can frequently communicate across these multiple sites, both on-premises and in the cloud. Even the public cloud is a collection of data centers. When applications are hosted in the cloud, they are using data center resources from the cloud provider. Data centers are commonly used to support a variety of enterprise applications and activities, including, email and file sharing, productivity applications, customer relationship management (CRM), enterprise resource planning (ERP) and databases, big data, artificial intelligence, machine learning, virtual desktops, communications and collaboration services.

Data centers commonly include routers, switches, firewalls, storage systems, servers, and application delivery controllers. Because these components frequently store and manage business-critical data and applications, data center security is critical in data center design. These components operate together to provide the core infrastructure for a data center: network infrastructure, storage infrastructure and computing resources. The network infrastructure connects servers (physical and virtualized), data center services, storage, and external connectivity to end-user locations. Storage systems are used to store the data that is the fuel of the data center. In contrast, applications can be considered to be the engines of a data center. Computing resources include servers that provide the processing, memory, local storage, and network connectivity that drive applications. Data centers commonly utilize additional infrastructure to support the center's hardware and software. These include power subsystems, uninterruptible power supplies (UPS), ventilation, cooling systems, fire suppression, backup generators, and connections to external networks.

Data center services are typically deployed to protect the performance and integrity of the core data center components. Data center therefore commonly use network security appliances that provide firewall and intrusion protection capabilities to safeguard the data center. Data centers also maintain application performance by providing application resiliency and availability via automatic failover and load balancing.

One standard for data center design and data center infrastructure is ANSI/TIA-942. It includes standards for ANSI/TIA-942-ready certification, which ensures compliance with one of four categories of data center tiers rated for levels of redundancy and fault tolerance. A Tier 1 (basic) data center offers limited protection against physical events. It has single-capacity components and a single, nonredundant distribution path. A Tier 2 data center offers improved protection against physical events. It has redundant-capacity components and a single, nonredundant distribution path. A Tier 3 data center protects against virtually all physical events, providing redundant-capacity components and multiple independent distribution paths. Each component can be removed or replaced without disrupting services to end users. A Tier 4 data center provides the highest levels of fault tolerance and redundancy. Redundant-capacity components and multiple independent distribution paths enable concurrent maintainability and one fault anywhere in the installation without causing downtime.

Many types of data centers and service models are available. A data center classification depends on whether it is owned by one or many organizations, how it fits (if at all) into the topology of other data centers, the technologies used for computing and storage, and its energy efficiency. There are four main types of data centers. Enterprise data centers are built, owned, and operated by companies and are optimized for their end users. In many cases, they are housed on a corporate campus. Managed services data centers are managed by a third party (or a managed services provider) on behalf of a company. The company leases the equipment and infrastructure instead of buying it. In colocation ("colo") data centers, a company rents space within a data center owned by others and located off company premises. The colocation data center hosts the infrastructure: building, cooling, bandwidth, security, etc., while the company provides and manages the components, including servers, storage, and firewalls. Cloud data centers are an off-premises form of data center in which data and applications are hosted by a cloud services provider such as AMAZON WEB SERVICES (AWS), MICROSOFT (AZURE), or IBM Cloud.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

What is claimed is:

1. A non-transitory computer readable medium having program instructions stored thereon that are capable of causing a database system to perform operations comprising:

storing, in a catalog table of the database system, a set of default configuration settings that control operation of the database system;

receiving, by a parser of the database system, a query requesting data from the database system, wherein the query is received with metadata about the query;

determining, by the parser and based on the metadata, that a configuration settings override has been specified for the query, wherein the configuration settings override indicates that one or more of the default configuration settings are to be replaced with one or more configuration settings specific to the query, wherein the one or more default configuration settings to be replaced include a resource allocation for execution of the query, and wherein the determining includes accessing an override table in the database system storing a plurality of configuration settings overrides;

determining, by a query optimizer of the database system and based on the configuration settings override, that a default query plan for the query does not comply with the specific configuration settings;

determining, by the query optimizer and based on the specific configuration settings, a specific query plan corresponding to the query; and in response to the determining, executing, by an execution engine of the database system, the query using the one or more specific configuration settings and the specific query plan.

2. The non-transitory computer readable medium of claim 1, wherein the metadata includes information identifying a tenant that includes a plurality of users accessing the database system.

3. The non-transitory computer readable medium of claim 1, wherein the metadata includes information identifying a specific user associated with the query.

4. The non-transitory computer readable medium of claim 1, wherein:

the default configuration settings cause the executing of the query with the default configuration settings to be limited to a first period of time; and the specific configuration settings cause the executing of the query with the specific configuration settings to be limited to a second period of time.

5. The non-transitory computer readable medium of claim 1, wherein the operations further comprise:

prior to receiving the query, caching a set of query plans, including the default query plan; and in response to receiving the query, determining, based on the configuration settings override, that the cached default query plan does not comply with the specific configuration settings.

6. The non-transitory computer readable medium of claim 1, wherein the resource allocation includes a permitted length of time for the executing of the query.

7. The non-transitory computer readable medium of claim 1, wherein the resource allocation includes a memory limit of the database system for the executing of the query.

8. The non-transitory computer readable medium of claim 1, wherein the operations further comprise:

determining, based on the configuration settings override, whether to cache query plans in a cache of the database system as a result of the executing.

9. The non-transitory computer readable medium of claim 8, wherein the operations further comprise:

receiving, from a graphical user interface, the configuration settings override, wherein the receiving of the configuration settings override causes the storing.

10. The non-transitory computer readable medium of claim 1, wherein the operations further comprise:

receiving, by the database system, two or more instances of the same query, wherein each instance is associated with a different tenant identifier; and determining, for each instance based on the respective tenant identifier, a different configuration settings override.

11. A method, comprising:

storing, by a database system in a catalog table of the database system, a set of default configuration settings that control operation of the database system;

receiving, by a parser of the database system, a given query requesting data from the database system, wherein the given query is received with metadata about the given query;

determining, by the parser and based on the metadata, a configuration settings override for the given query indicating that one or more of the default configuration settings are to be replaced with one or more configuration settings specific to the given query, wherein the one or more default configuration settings to be replaced include a performance requirement for execution of the given query, and wherein the determining includes accessing an override table in the database system storing a plurality of configuration settings overrides;

determining, by a query optimizer of the database system and based on the configuration settings override, that an initial query plan for the given query does not comply with the specific configuration settings;

determining, by the query optimizer and based on the specific configuration settings, a specific query plan corresponding to the given query; and executing, by an execution engine of the database system in response to the determining, the given query using the one or more specific configuration settings and the specific query plan.

12. The method of claim 11, further comprising:

receiving, by the database system, two or more instances of the same query, wherein each instance is associated with a different tenant identifier; and determining, for each instance based on the respective tenant identifier, a different configuration settings override.

13. The method of claim 11, wherein entries of the override table that store configuration settings overrides are indexed based on a tenant identifier or a user identifier.

14. The method of claim 11, wherein determining that an initial query plan for the given query does not comply with the specific configuration settings includes:

receiving, by the query optimizer, the specific configuration settings from the parser; and evaluating, by the query optimizer, the received specific configuration settings against cached query plans.

15. The method of claim 11, further comprising:

in response to determining that the initial query plan does not comply with the configuration settings override, evicting the initial query plan from a query plan cache.

16. A computer system, comprising:

one or more processors;

memory having program instructions stored therein that are executable by the one or more processors to implement a database system performing operations including:

maintaining, in a catalog table of the database system, a set of default configuration settings that control operation of the database system;

receiving, by a parser of the database system, a query requesting data from the database system;

determining, by the parser, that a configuration settings override has been specified for the query, wherein the configuration settings override indicates that one or more of the default configuration settings are to be replaced with one or more configuration settings specific to the query, wherein the one or more default configuration settings to be replaced include a setting identifying a limit for executing the query, and wherein the determining includes accessing an override table in the database system storing a plurality of configuration settings overrides;

determining, by a query optimizer of the database system and based on the configuration settings override, that an initial query plan for the query does not comply with the specific configuration settings;

determining, by the query optimizer and based on the specific configuration settings, a specific query plan corresponding to the query; and in response to the determining, executing, by an execution engine of the database system, the query using the one or more specific configuration settings and the specific query plan.

17. The computer system of claim 16, wherein the operations further comprise:

determining, based on the query, metadata that specifies, for the query, one or more of: a user identifier, a query identifier, or a tenant identifier; and identifying, based on the determined metadata, the configuration settings override.

18. The computer system of claim 16, wherein entries of the override table that store configuration settings overrides are indexed based on a tenant identifier or a user identifier.

19. The computer system of claim 18, wherein the operations further comprise:

determining, by the database system, the initial query plan for the query based on the default configuration settings; and storing the initial query plan in a database cache of query plans.

* * * * *